US009844999B2

(12) United States Patent
Krause

(10) Patent No.: US 9,844,999 B2
(45) Date of Patent: Dec. 19, 2017

(54) ASSEMBLY WITH A FILTER ELEMENT

(71) Applicant: CARL FREUDENBERG KG, Weinheim (DE)

(72) Inventor: Martin Krause, Brno (CZ)

(73) Assignee: CARL FREUDENBERG KG, Weinheim (DE)

( * ) Notice: Subject to any disclaimer, the term of this patent is extended or adjusted under 35 U.S.C. 154(b) by 122 days.

(21) Appl. No.: 14/923,499

(22) Filed: Oct. 27, 2015

(65) Prior Publication Data

US 2016/0121698 A1 May 5, 2016

(30) Foreign Application Priority Data

Oct. 29, 2014 (EP) ..................................... 14190869

(51) Int. Cl.
*B60H 3/06* (2006.01)
*B01D 46/00* (2006.01)
*B01D 46/10* (2006.01)
*B01D 46/52* (2006.01)

(52) U.S. Cl.
CPC ....... *B60H 3/0658* (2013.01); *B01D 46/0031* (2013.01); *B01D 46/10* (2013.01); *B01D 46/523* (2013.01); *B60H 3/0641* (2013.01)

(58) Field of Classification Search
CPC ........ B01D 27/06; B01D 45/00; B01D 27/07; B01D 29/07; B01D 46/10; B01D 53/22; F02C 7/05
USPC .............. 55/385.3, 498, 521, 499, 497, 500; 210/493.1, 941, 966, 494.3, 497.01
See application file for complete search history.

(56) References Cited

U.S. PATENT DOCUMENTS 4,008,060 A * 2/1977 Andreae ................ B01D 45/16
  55/486
4,619,675 A * 10/1986 Watanabe ............ B01D 46/106
  55/498
4,734,195 A * 3/1988 Lhuillier ............... D06F 43/085
  55/521
5,320,096 A * 6/1994 Hans ................. A61M 16/1045
  128/201.13

(Continued)

FOREIGN PATENT DOCUMENTS

DE     4327368 A1    2/1995
DE    19715755 C1   10/1998

(Continued)

*Primary Examiner* — Duane Smith
*Assistant Examiner* — Minh-Chau Pham
(74) *Attorney, Agent, or Firm* — Leydig, Voit & Mayer, Ltd.

(57) ABSTRACT

An assembly having an intake connector with an air entrance for an air-conditioning system and a filter element having a concertina bellows having peripheral troughs and peripheral peaks, wherein the filter element has a water-repellent filter medium and wherein the filter element at least partially covers the air entrance, suitable for discharging snow and water, in particular snowmelt, to avoid flow into the air-conditioning system of a motor vehicle and to minimize damage to a filter element, wherein the concertina bellows is disposed so as to be inclined at an angle of 5° to 90°, preferably at an angle of 15° to 85°, in relation to the horizontal, wherein the filter element has an outflow unit for a water outflow from the peripheral troughs.

20 Claims, 3 Drawing Sheets

(56) References Cited

U.S. PATENT DOCUMENTS

| | | | | |
|---|---|---|---|---|
| 5,361,829 A | * | 11/1994 | Kreutzer | F28F 1/128 |
| | | | | 165/152 |
| 5,518,167 A | * | 5/1996 | Capy | B65D 65/02 |
| | | | | 229/87.03 |
| 6,749,669 B1 | * | 6/2004 | Griffiths | B03C 3/14 |
| | | | | 55/DIG. 38 |
| 8,157,891 B2 | * | 4/2012 | Montie | B01D 46/0001 |
| | | | | 55/521 |
| 2006/0005518 A1 | | 1/2006 | Duffy et al. | |
| 2009/0139200 A1 | * | 6/2009 | Colaprisco | B01D 46/12 |
| | | | | 60/39.092 |

FOREIGN PATENT DOCUMENTS

| | | |
|---|---|---|
| DE | 602005003958 T2 | 12/2008 |
| DE | 102012012669 A1 | 1/2013 |
| JP | 115429 A | 1/1999 |

* cited by examiner

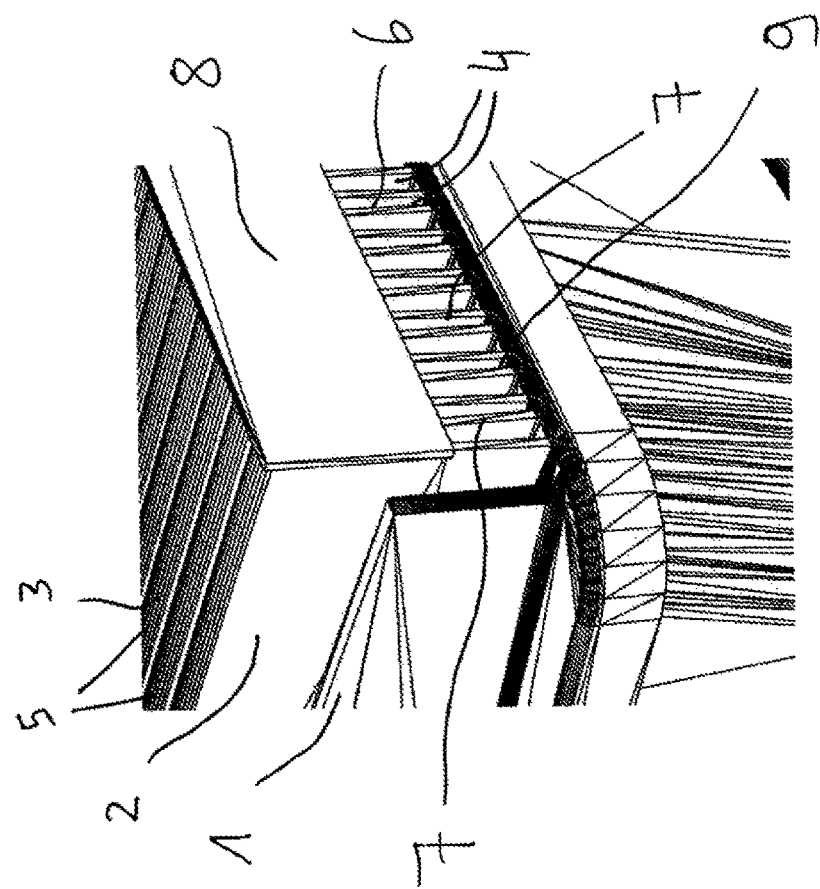

ASSEMBLY WITH A FILTER ELEMENT

CROSS-REFERENCE TO RELATED APPLICATIONS

Priority is claimed to European Patent Application No. 14 190 869.9, filed on Oct. 29, 2014, the entire disclosure of which is hereby incorporated by reference herein.

FIELD

The invention relates to an assembly with an intake connector, an air entrance for an air-conditioning system, and a filter element.

BACKGROUND

A filter element in which the fold edges are bordered using an edge strip is already known from DE 60 2005 003 958 T2. Such filter elements are used in a multiplicity of filter-technological assemblies.

In some motor vehicles, the interior cabin air is taken in below the windscreen, namely in the water box. In regions with a high prevalence of snow, water or coarse dust, this region of a motor vehicle which is provided for the intake may be clogged, in particular clogged by snow.

Snow or snowmelt may then be taken into the air-conditioning system, in particular in the direction of a filter element. The air-conditioning system may be damaged by water ingress.

In order to prevent this, it is already known for a non-woven fabric which is installed in an interior, may contain activated carbon and is disposed behind components to be protected to be employed. However, a wet filter element additionally humidifies the fresh air, and activated carbon becomes ineffective on account of moisture.

SUMMARY

An aspect of the invention provides an assembly, comprising: an intake connector including an air entrance for an air-conditioning system, and a filter element including a concertina bellows, wherein the concertina bellows includes peripheral troughs and peripheral peaks, wherein the filter element includes a water-repellent filter medium, wherein the filter element at least partially covers the air entrance, wherein the concertina bellows is disposed so as to be inclined at an angle of 5° to 90°, in relation to the horizontal, and wherein the filter element includes a outflow unit configured for a water outflow from the peripheral troughs.

BRIEF DESCRIPTION OF THE DRAWING

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows the assembly according to FIG. 1, in a detailed view.

DETAILED DESCRIPTION

Figure 1:
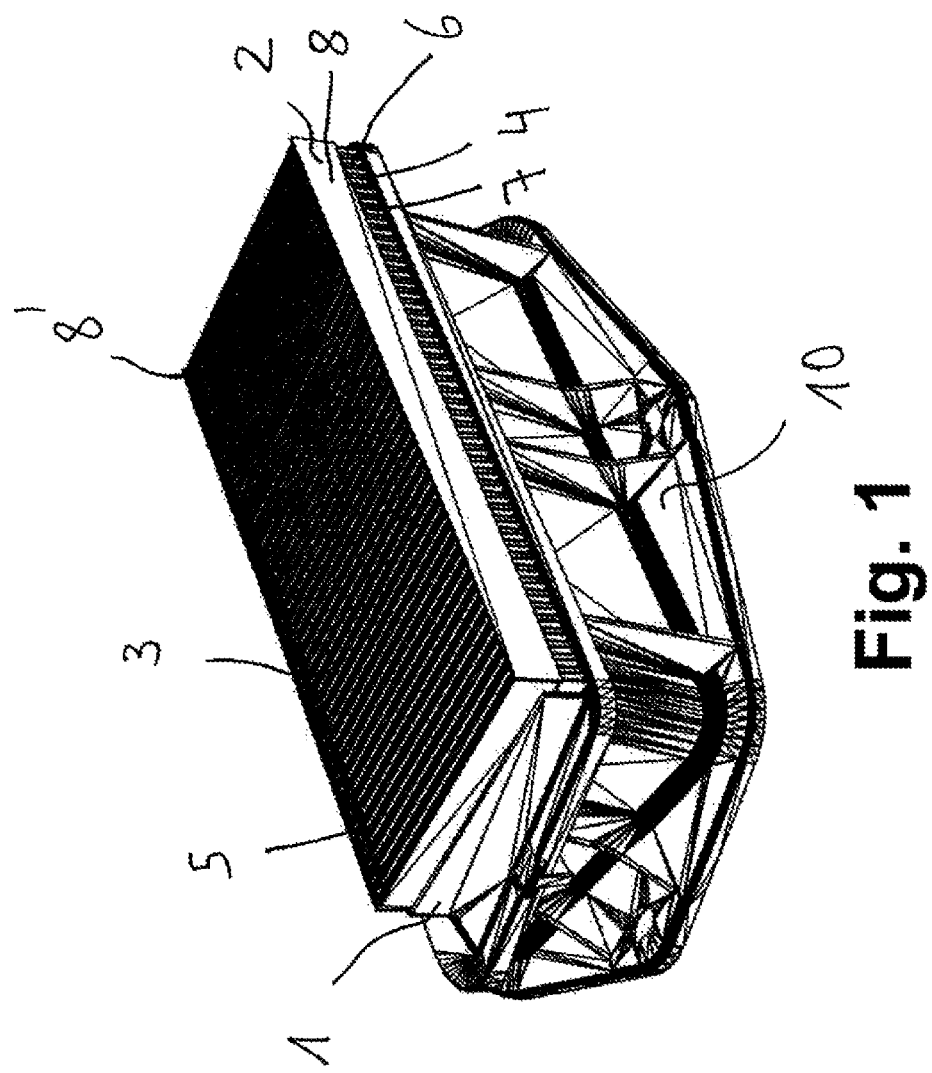
FIG. 1 shows an assembly with the intake connector, the air entrance of which is covered by a filter element.
Figure 2:
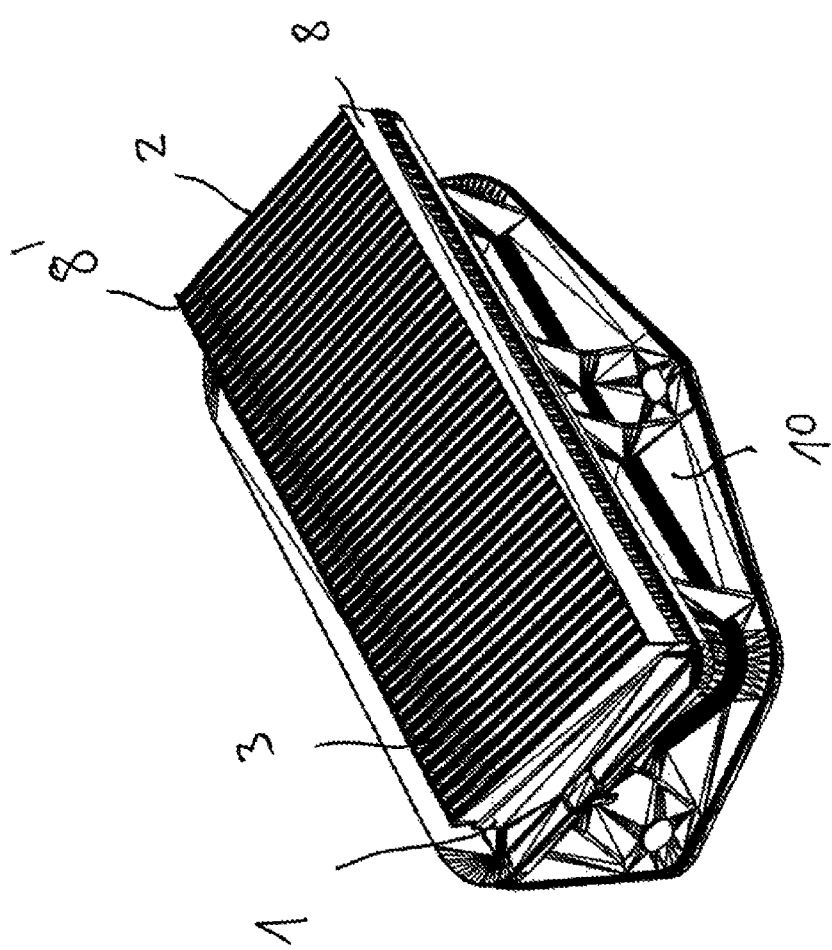
FIG. 2 shows the assembly according to FIG. 1, in a further view.

An aspect of the invention provides a manner for discharging snow and water, in particular snowmelt, such that as far as possible they do not flow into the air-conditioning system of an motor vehicle and cause as little damage as possible to a filter element.

According to an aspect of the invention, it has firstly been recognized that, by way of a suitable modification in order to protect an intake connector, a filter element which is already known may be used. The filter element protects the intake connector from snow and water and specifically prevents the intake connector from being blocked by snow. According to the invention, the modified filter element specifically causes discharge of snowmelt in a guided manner. Against this background it has surprisingly been established that cleaning of the filter element takes place on account of the snowmelt flowing out. On account of this so-called "cross-flow effect", very long service life spans of the filter element are achieved. Since the filter element is installed at a slight incline, outflowing water always creates the "cross-flow effect" which cleans the filter medium. This also arises in the case of rain or in a car wash, for example. To this extent snow and water, in particular snowmelt, are discharged such that as far as possible they do not flow into the air-conditioning system of a motor vehicle and cause as little damage as possible to a filter element.

Fold edges could run in each case on one side of the concertina bellows so as to follow a zigzag line or an undulated line, wherein the fold edges on at least one side of the concertina bellows are bordered by an edge strip and wherein the edge strip is disposed or configured on the fold edges in such a manner that water can flow out from at least one peripheral trough. On account thereof, the means for the water outflow comprise an edge strip which is disposed in a suitable manner. The edge strip stabilizes the spacing of the folds, seals, and nevertheless leaves an opening free for the outflow of water.

Against this background, a channel which is not closed off by the edge strip could be configured on the base of at least one peripheral trough. In this way, water in sizeable amounts can flow out. On one side, the fold edges are not completely closed off by the edge strip, such that in the lower region of each V-shaped fold an opening remains, through which the snowmelt can flow and can be directed into a water box. On account of a hydrophilic edge strip, in particular an edge strip which is made of polyethylene terephthalate, liquid flows out across a large area.

Against this background, the means for the water outflow are configured as V-shaped openings. The height of these openings is readily adjustable by way of the width of the edge strip.

The edge strip could be configured as an injection-molded component. In the case of an injection molding method outflow openings can be incorporated in a targeted manner. Moreover, an injection-molded component can be readily latched to an intake connector. To this end, at least one latching means which is connectable in a form-fitting or force-fitting manner to a counterpiece on the intake connector could be configured on the edge strip.

The filter medium could have water-repellent non-woven fabric, wherein the filter medium has one to three layers, wherein the filter medium and/or at least one layer has fibers of polyethylene terephthalate, polypropylene, polyamide, or polyethylene, or wherein the filter medium and/or at least one layer has mixtures of the above-mentioned fibers. On account of a layered construction, the filtration effect may be modified. On account of the mentioned materials or components, the filter medium may be designed so as to be suitably water-repellent. Preferably, the filter medium could be composed of a water-repellent non-woven fabric. The layer or layers are preferably configured from one component material or in each case so as to be materially integral.

The non-woven fabric could have a coating of nanofibers. On account thereof, very fine particles can be separated.

The intake connector could be disposed in a water box of a motor vehicle. The pleated, specifically folded, filter element could be dimensioned such that it fits onto the intake connector for the interior inlet air, which is disposed in the water box of the motor vehicle.

In order for contamination by way of particles to be kept modest, the filter medium could preferably be electrostatically uncharged.

The filter element described here may simultaneously serve as a preliminary filter for separating coarse dust.

The filter element described here may be conceived as a "lifetime" component or be cleanable. Cleaning may be performed by blowing down or by active washing down.

The filter element described here may be used as an inertial separator or in combination therewith. In this way, inertial separation is combined with the "cross-flow effect" described above.

The filter element described here may be used in all motor vehicles in which fresh air is taken in through the water box. The filter element may be used in particular for filtering the inlet air of an air-conditioning system.

FIG. 1 shows an assembly comprising an intake connector 1 having an air entrance (not shown) for an air-conditioning system, and a filter element 2 having a concertina bellows 3 which has peripheral troughs 4 and peripheral peaks 5, wherein the filter element 2 has a water-repellent filter medium and wherein the filter element 2 at least partially covers the air entrance. It is specifically illustrated that the filter element 2 completely covers the air entrance.

The filter element 2 reduces the air volume by about 5 to 30% and enables separation of snowflakes in the size range of 10 μm to 200 μm.

This assembly is installed in a motor vehicle (not shown). The concertina bellows 3, in the installed state, namely when the motor vehicle is standing on a plane which is not inclined, is disposed so as to be inclined at an angle of 5° to 90° in relation to the horizontal, wherein the filter element 2 has means 6 for a water outflow from the peripheral troughs 4.

Fold edges 7 run in each case on one side of the concertina bellows 3 so as to follow a zigzag line or an undulated line, wherein the fold edges 7 on at least one side of the concertina bellows 3 are bordered by an edge strip 8 and wherein the edge strip 8 is disposed or configured on the fold edges 7 in such a manner that water can flow out from at least one peripheral trough 4.

A channel 9 which is not closed off by the edge strip 7 is configured on the base of at least one peripheral trough 4. To this extent, the means 6 for a water outflow are designed as openings which in the cross section are V-shaped and not closed off by the edge strip 8.

The filter medium has a water-repellent non-woven fabric, wherein the filter medium has one to three layers, wherein the filter medium and/or at least one layer has fibers of polyethylene terephthalate, polypropylene, polyamide, or polyethylene, or wherein the filter medium and/or at least one layer has mixtures of the above-mentioned fibers. Specifically, the filter medium is made of polypropylene and has an area weight of 105 g/m². The filter element 2 is 195 mm long and 110 mm wide. The fold pitch is 10 mm. A fold pitch between 5 mm and 15 mm is optimal.

The intake connector 1 is disposed in a water box 10 of the motor vehicle (not shown). A flexible edge strip 8' extends counter to the travel direction, having a height of 55 mm and being flush at the top. The flexible edge strip 8 extends in the travel direction, having a height of 22 mm and being likewise flush at the top with the concertina bellows 3. The height of the free-standing peripheral troughs 4 is 6 mm, the peripheral troughs 4 here projecting into the water box 10. To this extent, the means 6 for a water outflow are designed as openings which in the cross section are V-shaped and not closed off by the edge strip 8. The height of these openings is in each case 6 mm.

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. An assembly, comprising:
   an intake connector including an air entrance for an air-conditioning system;
   a filter element including a concertina bellows, wherein the concertina bellows includes peripheral troughs at a bottom of the bellows and peripheral peaks at a top of the bellows with fold edges running on each side of the bellows so as to follow a zigzag line or an undulated line, the top and bottom of the concertina bellows being inclined at an angle of 5° to 90°, in relation to the horizontal,
   an edge strip disposed over the fold edges on at least one side of the concertina bellows such that water can flow out from at least one of the peripheral troughs,
   wherein the filter element includes a water-repellent filter medium,
   wherein the filter element at least partially covers the air entrance,
   and wherein the filter element includes an outflow unit configured for a water outflow from the at least one peripheral trough.

2. The assembly of claim 1, wherein the concertina bellows is disposed so as to be inclined at an angle of 15° to 85°, in relation to the horizontal.

3. The assembly of claim 1, further comprising:
a channel, which is not closed off by the edge strip, configured on the base of at least one peripheral trough.

4. The assembly of claim 1, wherein the outflow unit is configured as V-shaped openings.

5. The assembly of claim 1, wherein the edge strip is an injection-molded component.

6. The assembly of claim 1, wherein the filter medium includes a water-repellent non-woven fabric,
wherein the filter medium includes one to three layers,
wherein at least one layer of the filter medium includes fibers including polyethylene terephthalate, polypropylene, polyamide, polyethylene, or a mixture of two or more of any of these.

7. The assembly of claim 6, wherein the water-repellant non-woven fabric includes a coating of nanofibers.

8. The assembly of claim 1, wherein the intake connector is disposed in a water box of a motor vehicle.

9. A supply air filter of an air-conditioning system, comprising:
a filter element including a concertina bellows including peripheral troughs and peripheral peaks,
wherein the filter element includes a water-repellent filter medium,
wherein the filter element includes an outflow unit for a water outflow from the peripheral troughs,
wherein fold edges run in each case on one side of the concertina bellows so as to follow a zigzag line or an undulated line,
wherein the fold edges on at least one side of the concertina bellows are bordered by an edge strip,
wherein the edge strip is disposed or configured on the fold edges such that water can flow out from at least one peripheral trough,
wherein a channel, which is not closed off by the edge strip, is configured on a base of at least one peripheral trough, and
wherein the outflow unit is configured as V-shaped openings.

10. A method filtering supply air of an air-conditioning system, the method comprising:
contacting the supply air with a filter element, the filter element including
a concertina bellows including peripheral troughs and peripheral peaks,
a water-repellent filter medium, and
an outflow unit for a water outflow from the peripheral troughs,
wherein fold edges run in each case on one side of the concertina bellows so as to follow a zigzag line or an undulated line,
wherein the fold edges on at least one side of the concertina bellows are bordered by an edge strip,
wherein the edge strip is disposed or configured on the fold edges such that water can flow out from at least one peripheral trough,
wherein a channel, which is not closed off by the edge strip, is configured on a base of at least one peripheral trough, and
wherein the outflow unit is configured as V-shaped openings.

11. The assembly of claim 1, wherein the edge strip comprises polyethyleneterephthalate.

12. The assembly of claim 9, wherein the edge strip comprises polyethyleneterephthalate.

13. The assembly of claim 10, wherein the edge strip comprises polyethyleneterephthalate.

14. The assembly of claim 1, wherein an upper plane of the concertina bellows, contacting the peripheral peaks of the concertina bellows, is substantially parallel to a lower plan of the concertina bellows, contacting the peripheral troughs.

15. The assembly of claim 9, wherein an upper plane of the concertina bellows, contacting the peripheral peaks of the concertina bellows, is substantially parallel to a lower plan of the concertina bellows, contacting the peripheral troughs.

16. The assembly of claim 10, wherein an upper plane of the concertina bellows, contacting the peripheral peaks of the concertina bellows, is substantially parallel to a lower plan of the concertina bellows, contacting the peripheral troughs.

17. The assembly of claim 1, wherein the filter element reduces air volume by 5 to 30%.

18. The assembly of claim 9, wherein the filter element reduces air volume by 5 to 30%.

19. The assembly of claim 10, wherein the filter element reduces air volume by 5 to 30%.

20. The assembly of claim 1, wherein the filter element is suitable to separate off snowflakes in a size range of 10 to 200 μm.

* * * * *